United States Patent Office 3,796,755
Patented Mar. 12, 1974

3,796,755
STABILIZATION OF CHLORINATED
HYDROCARBONS
Norman L. Beckers, Chardon, Ohio, assignor to Diamond
Shamrock Corporation, Cleveland, Ohio
No Drawing. Application July 13, 1970, Ser. No. 54,567,
now Patent No. 3,682,830, dated Aug. 8, 1972, which
is a continuation-in-part of abandoned application Ser.
No. 794,410, Jan. 27, 1969. Divided and this application Apr. 6, 1972, Ser. No. 241,552
Int. Cl. C07c 119/00
U.S. Cl. 260—566 B          2 Claims

ABSTRACT OF THE DISCLOSURE

A class of hydrazones, alkoxyaldehyde hydrazones, particularly useful as stabilizers for chlorinated hydrocarbons, are disclosed.

CROSS REFERENCE TO RELATED APPLICATIONS

This application is a divisional application of my co-pending application Ser. No. 54,567—Beckers filed July 13, 1970, now U.S. Pat. 3,682,830—Beckers issued Aug. 8, 1972, which in turn is a continuation-in-part application of my copending application, Ser. No. 794,410—Beckers filed Jan. 27, 1969, now abandoned.

BACKGROUND OF THE INVENTION

Among the most widely used industrial solvents are the chlorinated hydrocarbons, especially perchloroethylene, trichloroethylene and methyl chloroform. These solvents, particularly trichloroethylene and perchloroethylene, are widely used as degreasing solvents, most often as vapor phase degreasing solvents wherein the articles to be cleaned are suspended above the surface of the solvent which is then heated, the cleaning operation being effected by the action of the condensing vapors on the suspended articles. It is also widely known, however, that, during storage and particularly in use in vapor degreasing applications, the chlorinated hydrocarbons tend to decompose under the influence of oxygen, heat, light, metal salts, etc. Obviously this decomposition is undesirable in that it detracts from the operation of the solvent and limits its useful life.

In the past, in order to overcome the disadvantages of the decomposition while still obtaining the advantages of the chlorinated solvents, it has been the common practice to incorporate into the chlorinated solvents relatively minor quantities of numerous organic compounds which act as stabilizers to prevent decomposition from occurring to any substantial extent. Generally these stabilizers are, in fact, a combination of a number of organic compounds. Presently most commercial stabilizer systems include at least one nitrogen-containing compound such as an aliphatic amine, a heterocyclic nitrogen-containing compound, a nitroalkane, an aldehyde hydrazone or others. While certain of these compounds have been more effective than others in various and specific applications, the search continues for improved representatives of this class of stabilizer compounds.

STATEMENT OF THE INVENTION

Therefore it is an object of this invention to provide a class of nitrogen-containing compounds useful in the stabilization of chlorinated hydrocarbon solvents.

It is a further object of the invention to provide a process for stabilizing a chlorinated hydrocarbon solvent, as well as the stabilized solvent thereby obtained.

These and further objects of the present invention will become apparent to those skilled in the art from the description and claims which follow.

A new class of compounds has now been found, i.e., alkoxyaldehyde hydrazones, which have the following general formula:

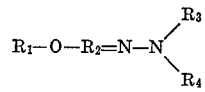

wherein $R_1$ and $R_2$ are members selected from the group consisting of saturated and unsaturated aliphatic groups of from 1–3 carbon atoms, and $R_3$ and $R_4$ are selected from the group consisting of hydrogen and saturated and unsaturated aliphatic groups of from 1 to 3 carbon atoms; and are extremely effective compounds for use in the stabilization of chlorinated hydrocarbons. Thus a stable composition of matter comprises a chlorinated hydrocarbon solvent selected from the group consisting of perchloroethylene, trichloroethylene and methylchloroform together with a stabilizing amount of an alkoxyaldehyde hydrazone having the above general formula.

DESCRIPTION OF THE PREFERRED EMBODIMENTS

Throughout the specification and claims the term "chlorinated hydrocarbon solvents" is intended to refer to the lower aliphatic saturated and unsaturated hydrocarbons such as perchloroethylene, trichloroethylene, methylchloroform, chloroform, methylene chloride, carbon tetrachloride, dichloroethylene, trichloroethane, vinylidene chloride, and the like. Because of their widespread industrial use, particularly in those applications wherein decomposition of the chlorinated hydrocarbon solvent is a particular problem, reference will most often hereinafter be made to, and the preferred embodiments include, the chlorinated solvents selected from the group consisting of perchloroethylene, trichloroethylene and methylchloroform.

The alkoxyaldehyde hydrazones of the present invention have the general formula:

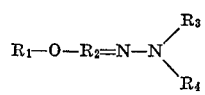

wherein $R_1$ and $R_2$ are members selected from the group consisting of saturated and unsaturated aliphatic groups of from 1–3 carbon atoms and wherein $R_3$ and $R_4$ are members selected from the group consisting of hydrogen and saturated and unsaturated aliphatic groups of from 1–3 carbon atoms. Such compounds are readily prepared by the condensation reaction of approximately equimolar quantities of an alkoxyaldehyde and a hydrazine. For example, methoxyacetaldehyde reacts with dimethylhydrazine in the following manner:

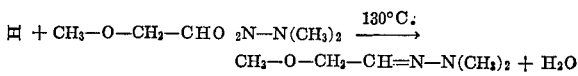

the product, methoxyacetaldehyde dimethylhydrazone, being one of the preferred compounds of the present invention. Conveniently the reaction can be carried out in a chlorinated hydrocarbon solvent which serves as an inert reaction medium from which water separates, driving the reaction to completion. Ideally, if the product is to be used to stabilize a chlorinated hydrocarbon solvent, the same solvent can be used as the reaction medium, thereby eliminating the need for its removal prior to use. Illustrative of compounds defined by the above formula, in addition to methoxyacetaldehyde dimethylhydrazone, are methoxypropionaldehyde dimethylhydrazone, ethoxyformaldehyde methylethylhydrazone, propoxyacetaldehyde methylhydrazone and the like.

The quantity of alkoxyaldehyde hydrazone useful in the practice of the present invention for stabilization purposes will of course vary depending upon the conditions of use, the identity and quantity of other stabilizers incorporated into the chlorinated solvent and other practical considerations and, hence, is referred to merely as "a stabilizing amount." However, it may generally be said that concentrations within the range of from 0.001–2.0 percent and preferably from 0.01–0.5 percent, by weight, on a chlorinated solvent basis, may be used. Higher concentrations may of course be used without detrimental effect, but are usually uneconomic.

Obviously, and as is pointed out hereinbelow, the types and causes of decomposition to which the chlorinated solvents are susceptible are numerous and therefore it will in most instances be desirable to incorporate, in addition to the alkoxyaldehyde hydrazones, various amounts of other stabilizers which either provide a different stabilizing effect or serve to reinforce the action of the hydrazones.

One class of compounds which may advantageously be incorporated into the chlorinated solvent together with the hydrazones of the present invention are the various amine materials, both aliphatic and aromatic, such as diethylamine, triethylamine, dipropylamine, diisopropylamine, diethanolamine, morpholine, N-methylmorpholine, pyridine and aniline. Other nitrogen-containing materials such as pyrroles, e.g., methyl-pyrrole and certain nitroalkanes such as nitroalkanes such as nitromethane and nitropropane are also useful.

Furthermore a number of organic oxygen-containing compounds are useful. For example, the organic epoxides such as ethylene oxide, 1,2-propylene oxide, 1,2-butylene oxide, epichlorohydrin, glycidol, cyclohexene oxide and the like may be used. Also useful are certain cyclic ethers such as tetrahydropyran, 1,4-dioxane, dioxolane, trioxane and tetrahydrofuran.

Another useful class of additives are thase aromatic compounds containing a phenol group such as phenol itself, thymol, catechol, isoeugenol and other organic phenols having a low boiling point.

Also useful are a number of miscellaneous organic compounds such as esters, e.g., ethyl acetate; alcohols, e.g., amyl alcohol and methyl butynol, and ketones, e.g., methyl ethyl ketone.

It is thought to be somewhat surprising that the alkoxyaldehyde hydrazones of the present invention function as effectively as they do in view of their relatively high boiling points. Usually stabilizers for chlorinated solvents are chosen so that their boiling points are within a few degrees of the solvent themselves in order that both the vapor and liquid phases of the solvent will be stabilized during use. Generally speaking, stabilizers having higher boiling points do not function in the vapor phase since the great majority of these stabilizers remain in the liquid body of the solvent. This, however, is not found to be the case in the present invention for although methoxyacetaldehyde dimethylhydrazone (MADH), for example, has a boiling point of about 145° C., it still functions effectively to prevent both the corrosion of metals treated with chlorinated hydrocarbon solvent vapors and the decomposition of the solvents themselves.

The following examples will show that MADH functions as well or better than acetaldehyde dimethylhydrazone (ADH), despite the difference in boiling points, i.e., 145° C. vs. 95° C. While not wishing to be bound by any theory it is possible that the alkoxyaldehyde hydrazones are one of the relatively small number of classes of compounds which form azeotropes with the chlorinated hydrocarbon solvents, thereby resulting in protection for both the liquid and vapor phases despite a disparity in boiling points.

In order that those skilled in the art may more readily understand the present invention and certain specific embodiments by which it may be carried into effect, the following illustrative examples are afforded.

EXAMPLE 1

Example 1 compares a conventional system consisting of 0.015 percent N-methyl morpholine, 0.003 percent thymol and 0.1 percent epichlorohydrin, all percents by weight, with a system consisting of 0.003 percent N-methyl morpholine, 0.003 percent thymol, 0.10 percent epichlorohydrin and 0.013 percent methoxyacetaldehyde dimethylhydrazone prepared by the above-described condensation reaction; the balance in both cases being perchloroethylene. The method of evaluation is referred to as the "72 hour stability test" and comprises placing 100 milliliters of the stabilized solvent system in question into a flask fited with a Soxhlet extractor and condenser together with 0.2 milliliter of distilled water. Three strips of 0.003 gauge steel 2.0 x 7.5 centimeters in size are located as follows: one strip goes into the solvent in the flask, the second strip is placed in the Soxhlet extractor while the third strip is inserted into the lower end of the condenser. A 100 watt incandescent light bulb is located one inch from the vapor tube of each Soxhlet extractor. Heat is then applied at a rate sufficient to cause the Soxhlet extractor to siphon every 8–10 minutes. Refluxing is continued for 72 hours, at which time the light and heat are turned off and the sample is allowed to cool. The steel strips are then removed, cleaned of corrosion and weighed and by comparison with the pretesting weight, the loss due to the corrosive effect of the solvent upon the steel is obtained. Obviously, this weight loss is a reflection of both the corrosive effect of the stabilized solvent and the extent of decomposition of the solvent. In this example the steel strips tested in the solvent containing only N-methyl morpholine, thymol and epichlorohydrin show a weight loss of 173 milligrams whereas the sample containing MADH shows a weight loss of only 81 milligrams.

EXAMPLE 2

In order to evaluate the effectiveness of a stabilizer of the present invention upon a methylchloroform solvent, a sample, Sample A, is prepared which contains 0.7 percent dioxane, 2.0 percent trioxane, 0.5 percent butylene oxide, 1 percent methyl butynol and 0.3 percent nitromethane, the balance being methylchloroform. Sample B is identical to Sample A with the exception that the 0.3 percent nitromethane is replaced with 0.05 percent methoxyacetaldehyde dimethylhydrazone. This test is a "48 hour reflux test" and is conducted by inserting a steel strip as above in the bottom of a condenser vapor tube which tube fits directly into a flask to which 100 milliliters of the stabilized solvent and 0.2 milliliter of distilled water have been added. Also placed in the liquid phase is a 6 x 1.5 x 0.03 centimeter strip of aluminum. The purpose of the aluminum is to catalyze the decomposition of ineffectively stabilized solvent systems. Heat is then applied and refluxing is continued at a moderate rate for 48 hours at which time the heat is turned off and the solvent is allowed to cool. Again, as in Example 1, the steel strip is removed and weighed to determine the amount of weight loss according to this test. In this instance Sample A shows a weight loss on the steel strip of approximately 31 percent whereas Sample B loses only 7 percent, by weight. From the above it is obvious that even though only one-sixth of the quantity of MADH was used as compared to nitromethane, a substantial decrease in corrosiveness of the solvent was obtained.

EXAMPLE 3

A stabilized perchloroethylene solvent composition is made consisting of perchloroethylene plus 0.003 percent N-methyl morpholine, 0.003 percent thymol, 0.1 percent epichlorohydrin and 0.012 percent acetaldehyde dimethylhydrazone (ADH). This is labeled Sample C. Sample D is prepared in the same manner as the preceding sample with the exception that an equal quantity of MADH is substituted for the ADH. A 72 hour stability test is conducted as described in Example 1 with the result that the ADH-stabilized system shows a weight loss on the steel strip of 187 milligrams, whereas the MADH-stabilized system shows a weight loss of only 81 milligrams. In addition, while the final pH of Sample D remains at 7.2, it is found that the pH of Sample C has fallen to 4.1, thereby indicating severe decomposition of solvent Sample C. Obviously then, the use of alkoxyaldehyde hydrazones is shown to yield results superior to those obtained using non-substituted aldehyde hydrazones.

EXAMPLE 4

Seventy-two hour stability tests are also conducted using the stabilizer systems of Example 1, both with and without MADH, this time using strips of aluminum and zinc and it is again found that a reduction in corrosion is noticed when MADH is incorporated in the stabilized perchloroethylene composition. Furthermore, at the end of the 72 hours the pH of the MADH-stabilized solvent in the presence of aluminum remains at 7.5 whereas without MADH the pH drops to 5.2. In the presence of copper, the MADH-containing solvent has a pH of 7.6 whereas without the MADH the pH is 4.0.

EXAMPLE 5

A solvent consisting of 0.26 percent butylene oxide, 0.11 percent n-propanol, 0.03 percent glycidol, 0.03 percent epichlorohydrin, 0.0075 percent thymol, 0.025 percent MADH and the balance trichloroethylene, when evaluated according to the 72 hour stability test of Example 1, results in a weight loss on the steel strip of only 6.7 milligrams.

Although the invention has been described with reference to certain specific embodiments thereof, it is not to be so limited since changes and alterations may be made therein which are still within the intended scope of the appended claims.

What is claimed is:
1. An alkoxyaldehyde hydrazone having the formula

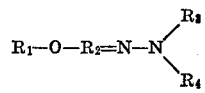

wherein $R_1$ is an alkyl of from 1–3 carbon atoms; $R_2$ is selected from the group consisting of —CH=,

—$CH_2$—CH=, and —$CH_2$—$CH_2$—CH=; and $R_3$ and $R_4$ are selected from the group consisting of hydrogen and alkyl of from 1–3 carbon atoms.

2. Methoxyacetaldehyde dimethylhydrazone.

References Cited

Chem. Abstr., vol. 1, column 43 (1907).
Chem. Abstr., vol. 32, column 1655, © (1938).

LEON ZITVER, Primary Examiner

G. A. SCHWARTZ, Assistant Examiner